United States Patent [19]

Weise et al.

[11] Patent Number: 5,009,816
[45] Date of Patent: Apr. 23, 1991

[54] BROAD LIQUID LEVEL GAS-LIQUID MIXING OPERATIONS

[75] Inventors: Mark K. Weise, North Haledon, N.J.; Jeffery P. Kingsley, Newburgh; Lawrence M. Litz, Pleasantville, both of N.Y.

[73] Assignee: Union Carbide Industrial Gases Technology Corporation, Danbury, Conn.

[21] Appl. No.: 514,937

[22] Filed: Apr. 26, 1990

[51] Int. Cl.⁵ ............................................. B01F 3/04
[52] U.S. Cl. ........................................ 261/21; 261/87; 261/93
[58] Field of Search ............................. 261/21, 87, 93

[56] References Cited

U.S. PATENT DOCUMENTS

| | | |
|---|---|---|
| Re. 32,562 | 12/1987 | Litz ..................... 261/91 |
| 3,186,700 | 6/1965 | Daman ................ 261/87 |
| 3,625,834 | 12/1971 | Muller ................. 261/93 |
| 3,815,879 | 6/1974 | Mikhailov et al. ... 261/93 |
| 4,145,383 | 3/1979 | Randall ............... 261/93 |
| 4,454,077 | 6/1984 | Litz ..................... 261/91 |
| 4,699,740 | 10/1987 | Bollenrath .......... 261/93 |
| 4,919,849 | 4/1990 | Litz et al. ............ 261/87 |

Primary Examiner—Tim Miles
Attorney, Agent, or Firm—Alvin H. Fritschler

[57] ABSTRACT

A gas-liquid mixing process and apparatus employing two or more stacked impeller-draft tube assemblies adapted to enable effective gas ingestion into a recirculating body of liquid by vortex development to be continued upon an appreciable variation in liquid level during the course of the mixing operation.

12 Claims, 1 Drawing Sheet

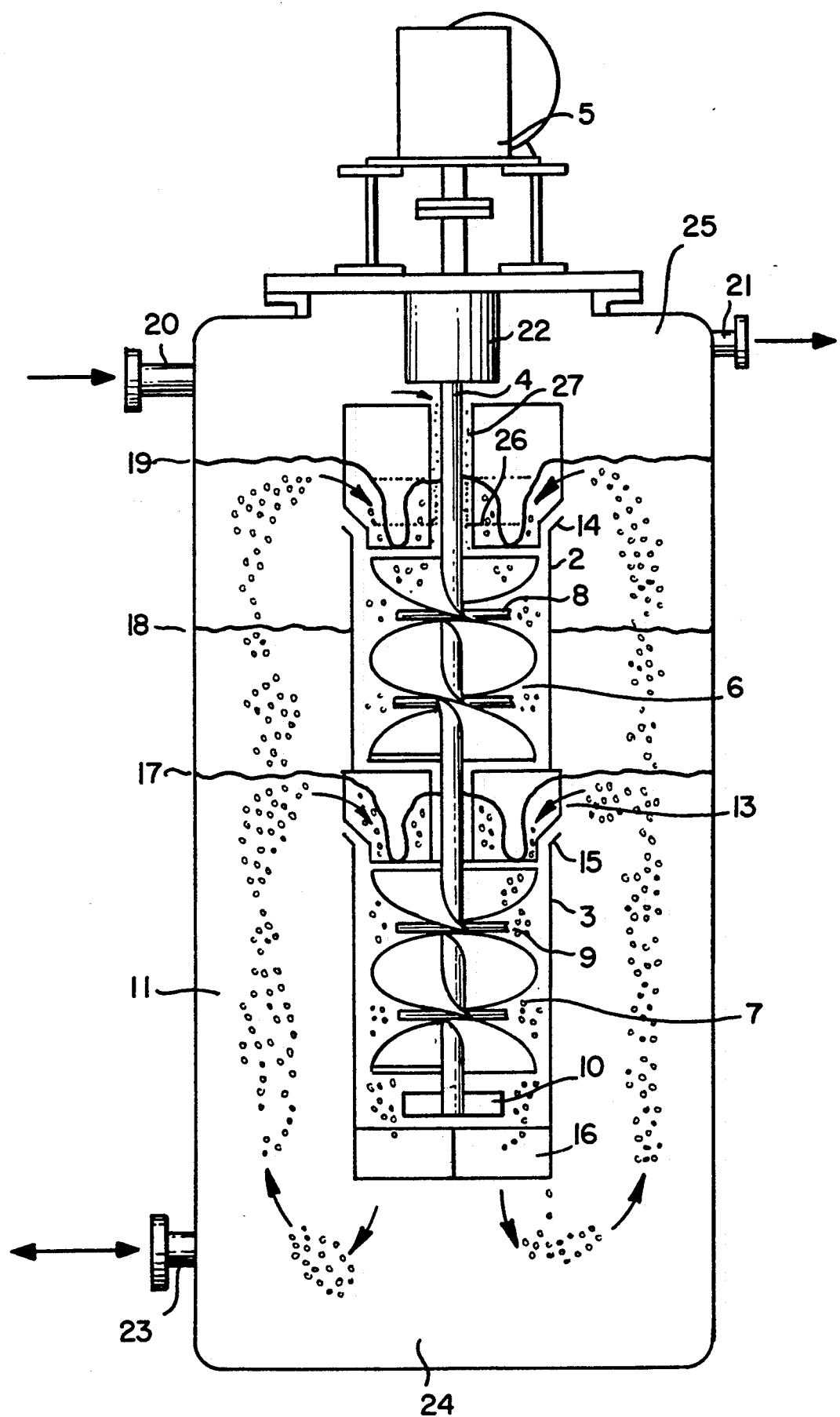

BROAD LIQUID LEVEL GAS-LIQUID MIXING OPERATIONS

BACKGROUND OF THE INVENTION

1. Field of the Invention

This invention relates to gas-liquid mixing operations. More particularly, it relates to enhanced gas-liquid mixing under particular operating conditions.

2. Description of the Prior Art

In the Litz U.S. Pat. No. 4,454,077 and the related reissue patent, U.S. Pat. No. 4,454,077 and the related reissue patent, U.S. Pat. No. Re. 32,562, an advantageous gas-liquid mixing process and apparatus are disclosed, such technology being referred to in the art as the Advanced Gas Reactor (AGR) system. As commonly and advantageously employed for a variety of practical commercial applications, the AGR system incorporates an open-ended hollow draft tube in a gas-liquid mixing vessel adapted to contain a body of said liquid. A down-pumping impeller positioned within the hollow draft tube is employed to pump liquid in said body of liquid into the top of said hollow draft tube for discharge at the bottom thereof and overall movement in a recirculating flow path in the mixing vessel. Because of such recirculation of the liquid downward in the hollow draft tube and upward in the vessel outside said tube, and aided by the positioning of baffles at the top of said draft tube, vortices are formed in the inlet area of the draft tube such as to draw feed gas from the overhead space above the liquid level in the vessel into the recirculating liquid passing downward into the draft tube. It is this gas ingestion mechanism that provides a major benefit of the AGR system.

Satisfactory vortex development for such gas-liquid mixing purposes depends, among various practical operating factors, on the maintaining of a proper liquid level above the top of the draft tube. At any particular liquid flow rate down the draft tube, the maximum gas ingestion will occur at a particular operating liquid level in the vessel above the draft tube. The liquid flow rate, in turn, is a function of the impeller-draft tube design and the rotational speed of the impeller. Thus, for a 9" double helical impeller, with a single 9" pitch length, running at 400 RPM, in water, within a baffled 10" inside diameter draft tube, the optimum liquid level is about 4" above the top of the draft tube. If the liquid level were about 8" above the top of the draft tube, however, the vortices would typically no longer form, and the gas ingestion rate would drop essentially to zero. Thus, operating at liquid levels above the optimum level can substantially reduce the gas ingestion capabilities of the AGR system.

In gas-liquid mixing operations subject to such non-optimum liquid levels, therefore, the effectiveness of the AGR system in achieving enhanced gas-liquid mixing may be seriously impaired. A typical gas-liquid mixing application in which an increasing liquid level may cause non-optimum operation of an AGR system involves the hydrogenation of nitro compounds. When nitrobenzene is hydrogenated to form aniline, for example, water is formed as a by-product. If the AGR reactor (mixing) vessel were initially filled to the optimum level of liquid nitrobenzene to obtain good gas ingestion, via the vortex mechanism referred to above, the level of liquid would rise as the reaction proceeded. Thus, the by-product water produced would increase the liquid volume and cause the liquid level to rise in the vessel. A point would be reached when the liquid level became so high that the vortices will no longer form. At this stage of the operation, the reaction would stop because of the lack of hydrogen gas bubbles in the liquid phase. It will also be appreciated that, prior to the reaching such stage, the rise in liquid level can be such that vortex formation and gas ingestion are less favorable than occurs when the liquid level is at the optimum level for the particular system. If the liquid level is too low, on the other hand, the impeller becomes liquid starved and gas flooded, such that there is an insufficient pumping action to entrain the gas.

Because of the highly desirable gas-liquid mixing action achievable by the use of the AGR system, there is a desire in the art for further developments enabling the AGR system to be operated, and its benefits achieved, over a broader range of liquid levels. Such developments, enabling the AGR system to accommodate applications subject to a non-optimum liquid level, as for example, a rising level of liquid within the mixing vessel, would enable the use of the AGR system to be desirably extended to a wider variety of practical gas-liquid mixing operations for which enhanced mixing, and enhanced gas utilization, are desired in commercial operations. An AGR modification has been proposed in which gas ingestion tubes are employed to aspirate gas into the impeller-draft tube system to accommodate modest increases in the liquid level above that suitable for good gas ingestion via the normal vortex action. However, there remains a need and desire in the art for further developments enabling the AGR process and system to be operated over a wide range of liquid level variations.

It is an object of the invention, therefore, to provide an improved AGR system and process for gas-liquid mixing.

It is another object of the invention to provide an AGR system and process capable of effective operation over a wide range of liquid levels in the course of a given gas-liquid mixing operation.

With these and other objects in mind, the invention is hereinafter described in detail, the novel features thereof being particularly pointed out in the appended claims.

SUMMARY OF THE INVENTION

The invention comprises an AGR system in which two or more AGR units, each having a hollow draft tube and a down-pumping impeller positioned therein, are stacked within a gas-liquid mixing vessel, with a horizontal split between the draft tubes of said units to permit gas and liquid feed to the lower unit.

BRIEF DESCRIPTION OF THE DRAWING

The invention is further described with reference to the accompanying single FIGURE drawing of the invention, with two AGR units positioned within a gas-liquid mixing vessel.

DETAILED DESCRIPTION OF THE INVENTION

The objects of the invention are accomplished by positioning two or more axial flow impeller-draft tube assemblies, i.e., AGR units, in a stacked configuration so that the discharge flow from the uppermost impeller-draft tube assembly feeds the inlet to the next lower impeller-draft tube assembly which, in turn, feeds the next lower impeller-draft tube assembly positioned within a gas-liquid mixing vessel. Each such assembly in sequence is constructed essentially as described in said U.S. Pat. No. Re. 32,562, with only the lower most assembly having secondary high shear impeller means positioned below the axial flow impeller and with adjacent impellers sharing a common baffle as disclosed below.

With reference to the drawing, gas-liquid mixing vessel 1 has upper hollow draft tube 2 and lower hollow draft tube 3 centrally and vertically disposed therein in stacked fashion. Impeller shaft 4, having suitable drive means 5, has helical, downward pumping upper impeller means 6 affixed thereto within upper draft tube 2, and helical, downward pumping lower impeller means 7 affixed thereto within lower draft tube 3. In the illustrated embodiment, as in a typical conventional AGR system, turbulence promoter blades 8 and 9 are also affixed to impeller shaft 4 within upper draft tube 2 and lower draft tube 3, respectively. When so employed in preferred embodiments, each such optional promoter blade 8 and 9 is desirably affixed to impeller shaft 4 at the point of maximum distance from the point of attachment of that portion of helical impellers 6 and 7 which is in the same horizontal plane as said blades 8 or 9. In the illustrated embodiment, it is desirable to employ six such promoter blades in each draft tube, with two of such promoter blades being radially opposed from one another at quarter, half and three-quarters of the helix length down impeller shaft 4 from the point on the shaft corresponding to the top of helical impeller 6 or 7. Such promoter blades can conveniently be employed in the form of bars, positioned desirably at a 90° angle to the points on shaft 4 where helical impellers 6 and 7 intersect said impeller shaft 4. The illustrated embodiment also includes radial flow impeller 10 fixedly connected to impeller shaft 4 for purposes of creating a high shear zone in the region of lower draft tube 3 between the position of helical impeller 7 and the lower end of lower draft tube 3.

Draft tubes 2 and 3 extend from above the upper end of helical impellers 6 and 7, respectively, to a point below the lower end thereof in a vertically stacked arrangement that is substantially above the floor of mixing vessel 1. Thus, adequate room is provided below lower draft tube 3 for liquid circulation down the inside of draft tubes 2 and 3 and in an upward direction in the annular space 11 between said draft tubes 2 and 3 and the walls of mixing vessel 1. In order to facilitate such desired recirculation pattern, vertically positioned inlet guide baffles 12 and 13 are commonly provided in the region of the upper inlet of draft tubes 2 and 3, respectively, to assist in the directing of the upwardly flowing liquid in annular space 11. It will be noted that inlet guide baffle 12 serves to assist in directing the upwardly flowing liquid in annular space 11 into the vortices created by the rotation of helical impeller 2 for downward passage within draft tube 2 and then within draft tube 3. In similar fashion, guide baffles 13 assist in the directing of a portion of the upwardly flowing liquid in annular space 11 into the vortices created by the rotation of helical impeller 7 for downward passage through draft tube 3. It will also be noted, in the illustrated embodiment, that the top portion of draft tubes 2 and 3 is an outwardly flared conical inlet section, i.e. sections 14 and 15, respectively, employed to further facilitate the passage of upwardly flowing liquid in annular space 11 into said draft tubes 2 and 3 for downward flow therein.

Such conical sections 14 and 15, preferably employed but not essential to the gas-liquid mixing operation carried out in mixing vessel 1, is conveniently such that the wall thereof forms an obtuse angle of from about 145° to about 175° with the walls of draft tubes 2 and 3. Baffle blades 16 or other such baffle means may be employed, if desired, in the lower end of lower draft tube 3 to increase the shear forces in this region so as to reduce the size of the gas bubbles exiting from the lower end of lower draft tube 3.

The lowest liquid level during the gas-liquid mixing operation of the invention is shown in the drawing as liquid level 17 with the liquid level being above lower draft tube 3 but below upper draft tube 2. An intermediate liquid level in which the liquid is above the bottom, but below the top, of upper draft tube 2, is shown as liquid level 18. As the liquid level rises, it reaches an upper level above the top of upper draft tube 2, as shown by liquid level 19. Feed gas is passed to mixing vessel 1 through gas inlet 20 in the upper portion thereof above the liquid level within the vessel, and gas can be vented from the upper portion of said mixing vessel 1 through vent means 21. In embodiments in which mixing vessel 1 is an enclosed vessel, seal means 22 can be provided to preclude the passage of gas from mixing vessel 1 along the annular space surrounding impeller shaft 4 as it extends upward from said vessel 1 to drive means 5. Feed liquid enters mixing vessel 1 through conduit means 23 positioned in the lower portion thereof, with the product of the gas-liquid mixing being conveniently withdrawn from the vessel through said conduit means 23.

In operation, the AGR system of the invention will comprise a body of liquid 24, a variable gas-liquid interface, as at liquid levels 17, 18 and 19 referred to above, and an overhead gas space 25 within mixing vessel 1.

When the body of liquid is at lower liquid level 17, i.e. its lowest point in the gas-liquid mixing operation, gas ingestion into body of liquid 24 is by vortex entrainment at the inlet to lower draft tube 3. Liquid pumping, gas dispersion in the liquid and gas-liquid mixing are accomplished by lower impeller 7. When the liquid level rises to liquid level 18, the liquid pumping, gas dispersion and gas-liquid mixing are also accomplished primarily by means of lower impeller 7. However, in this case, the liquid feed to lower impeller 7 is through the open space between upper draft tube 2 and lower draft tube 3, and the gas feed is through a vortex created by the rotation of liquid present in upper draft tube 2 caused by the rotation of upper impeller 6.

When the liquid level rises to above the top of upper draft tube 2, as at liquid level 19, gas ingestion is accomplished by vortex entrainment at the inlet of upper impeller 6. The resulting gas-liquid mixture is pumped downward by said upper impeller 6, and gas dispersion in the liquid occurs due to the turbulence created in upper draft tube 2. The discharge flow from said upper draft tube 2 serves as the feed for bottom impeller 7 within lower draft tube 3. Additional gas dispersion and gas-liquid mixing occur in lower draft tube 3, with the gas-liquid dispersion being discharged from the bottom of said lower draft tube 3.

In the practice of the invention, the top of the conical feed opening of lower draft tube 3, i.e. the top of conical section 15 or the top of said straight draft tube if no conical section is employed, should be positioned so as to desirably optimize the performance of lower impeller 7 when the liquid level is at its lowest level, i.e. liquid level 17, during the overall gas-liquid mixing operation. The operation of lower impeller 7 will thus be essentially the same as that of a conventional AGR system as described in the patents referred to above, and the advantageous mass transfer and mixing characteristics achieved in conventional AGR systems will be realized in the practice of the invention.

Upper impeller means 6 is located on the same axis as lower impeller means 7, and the bottom of said upper impeller means 6 within upper draft tube 2 should be within close proximity to, but should not protrude below, the bottom or discharge end of upper draft tube 2. The distance between upper and lower draft tubes 2 and 3 is preferably equivalent to, or substantially the same as, the height of liquid above lower draft tube 3 that results in optimum performance of lower impeller means 7, generally plus a fraction of an inch. The flow space between the draft tubes will be understood to enable the process and system of the invention to operate so as to achieve desirable AGR performance in gas-liquid mixing operations subject to a significant increase in liquid level over the course of the mixing operation being carried out in mixing vessel 1. Said flow space enables the lower impeller-draft tube assembly to operate properly at the lowest liquid level in the vessel, and it provides a means for liquid feed to lower impeller means 7 when the liquid level is not sufficiently high to feed upper impeller means 6.

It has been found particularly preferred for best performance of the adjacent pair of impeller means to position baffle means 13 at the upper end of lower draft tube 3 so that said baffle means 13 are extended upward to within about 1" to about ¼" of the bottom of upper impeller means 6, which extends to within close proximity to the bottom of upper draft tube 2. Said baffle means 13 serve three purposes. The first is to facilitate creation of the gas entrainment vortexes when the liquid level is low and only lower impeller means 7 is immersed in liquid. The second purpose of baffle means 13 is to prevent rotation of the bulk liquid within vessel 1, other than through the desired flow path indicated above. The third purpose is to suppress rotation of the discharge flow from upper impeller means 6, which would lead to undesired radial expulsion of the discharge flow from upper impeller means 6 away from the inlet to bottom draft tube 3. This is highly important to the operation of the system and process of the invention because such an undesired flow pattern, with flow directed radially away from lower draft tube 3, would reduce the pumping efficiency of lower impeller means 7, thereby reducing the gas dispersion and mass transfer capabilities of the system. It should be noted, similarly, that the lower radial impeller commonly used in the conventional AGR operation of the cited patents is not used in conjunction with upper impeller means 6 because of the radial flow pattern away from bottom draft tube 3 that would be created thereby, thus degrading the performance of impeller means 7 positioned therein.

In addition to the determination that it is not advantageous to employ a radial impeller below axial flow impeller means 6 in upper draft tube 2 and that said upper impeller means 6 should be positioned within a short distance of the bottom of said upper draft tube 2, it has also been determined that inlet baffles 13 for lower draft tube 3 and lower impeller means 7 should preferably extend almost to the bottom of upper impeller means 6 so as to act as bottom baffles for upper impeller means 6.

In the practice of the invention in illustrative examples thereof, it has been observed that gas holdup in the recirculation loop increased as the liquid level within the mixing vessel was increased. The liquid pumping rate appeared to increase as the liquid level was increased up to the bottom of the upper draft tube. As the liquid level was increased further, the pumping rate appeared to go through a minimum rate at a level near the midpoint of the upper draft tube, and then appeared to increase as the level of the top of the upper draft tube was approached. Tank experiments using the same two impeller systems described herein showed that gas holdup within the vessel varied between 3.2% and 2.4% as the liquid level was increased from the minimum at a point below the bottom of the upper draft tube to the maximum at a point above the top of the upper draft tube. These experiments also showed that, when the upper impeller was operating in conjunction with the lower impeller at high liquid levels, the volumetric mass transfer coefficient associated with the system of the invention was about the same as when only the lower impeller was operating at the lowest liquid level. This last result is important because it indicates that the presence of the upper impeller did not degrade the performance of the lower impeller at high liquid levels.

Those skilled in the art will appreciate that various changes and modifications can be made in the details of the AGR system described herein, and the operation thereof, without departing from the scope of the invention as set forth in the appended claims. For example, the AGR system can employ any suitable axial flow down-pumping impeller means to create the desired downward flow of liquid in the draft tube and resulting vortex formation. While helical impellers typically with a single or double helix configuration, are generally preferred, marine impellers or other commercially available axial flow impellers can also be employed. As noted above, the AGR system of the invention can include baffle means at the lower outlet end of the lowermost draft tube, e.g. baffle means 16, similar to inlet baffles 12 and 13 at the upper inlet end of two draft tubes employed in the embodiment illustrated in the drawing. Such outlet baffle means can be employed to facilitate the circulation of liquid upward in the annular space between the draft tubes and the walls of the mixing vessel, and to reduce the size of the gas bubbles exiting from the lower end of the lowermost draft tube. It will also be appreciated that the components of the AGR system can be made of any convenient, conventional materials compatible with the contemplated gas-liquid mixing operation to be carried out therein. Thus, various metal alloys, plastics and glass materials may be employed in particular applications. Representative examples of suitable materials include stainless steel, rubber coated steel and titanium.

While the invention has been particularly described and illustrated with respect to an embodiment in which two impeller-draft tube assemblies are stacked with a horizontal split between them to allow liquid and gas feed to the lower assembly, it will be understood that it is within the scope of the invention to employ an AGR system and process in which more than two such impeller-draft tube assemblies are stacked within the gas-liquid mixing vessel.

The invention can be employed with respect to any gas-liquid mixing operation in which it is desired to disperse a gas within a liquid or a liquid-solid mixture, or other such mixture involving a body of liquid, for purposes of dissolving the gas therein, or reacting the gas with components of the liquid or said solid phase, under circumstances in which the depth of liquid in the gas-liquid mixing vessel changes over the period of time during which the process is being carried out. This commonly occurs in semi-batch chemical reactors in hydrogenation, oxidation, chlorination or other reactions wherein a valuable reactive gas is employed. The particular gas-liquid mixing operations referred to in the Background portion hereof are representative examples of the type of operations in which the subject invention may be of advantage over the practice of conventional AGR systems as described in the cited patents. The multiple impeller AGR system and process of the invention is particularly desirable for gas-liquid mixing operations in which more than modest variations in liquid level are encountered. Thus, the invention enables advantageous AGR operations to be carried out with liquid level variations of up to 50% or more of the gas-liquid mixing vessel height.

It is also within the scope of the invention to provide gas ingestion tubes, previously developed to permit an increase in the gas-liquid level, in conjunction with one or more, including all, of the axial flow impeller means of the invention to further improve the desired gas ingestion operation. Such gas ingestion tubes are schematically illustrated in the drawing as tubes 26 fluidly connected to vertically extending hollow tubes 27 positioned in close proximity to impeller shaft 4. Said hollow tubes 27 extend from overhead gas space 25 above the gas-liquid interface, as at liquid level 19, to at least the location of gas ingestion tubes 26. Said hollow tubes may be affixed to or otherwise connected to said gas ingestion tubes 26 so as to establish fluid communication therebetween. The gas ingestion tubes comprise open ended tubes preferably extending essentially radially outward from said hollow tubes 27 into the surrounding liquid. As gas ingestion tubes 26 are moved through the surrounding liquid, the pressure in the bulk liquid immediately adjacent to the outer end of the tubes is reduced. As a consequence, liquid present in said gas ingestion tubes 26 before rotation of impeller shaft 4 will tend to flow out of the tubes upon rotation of said shaft. When the magnitude of the pressure reduction at the outer end of gas ingestion tubes 26 exceeds the hydrostatic head of liquid in gas ingestion tubes 26, all of the liquid will be drawn out of the tubes and of hollow tubes 27. At this point, gas will be drawn out as well, thereby creating a suction so that gas from overhead gas space 25 is drawn through hollow tubes 27 and gas ingestion tubes 26 for discharge in the form of gas bubbles into the surrounding liquid. In place of said vertically positioned hollow tubes 27, it is also within the scope of the invention to employ an impeller shaft 4 having a hollow portion corresponding to said tubes 27 and extending from the portion of the shaft positioned in overhead gas space 25 to at least the location of gas ingestion tubes 26 affixed to said impeller shaft 4 and being in fluid communication with said hollow portion thereof at any desired level with respect to one or more of the impeller-draft tube assemblies of the invention. In such latter embodiments, hollow impeller shaft 4 will be understood to have at least one gas inlet opening at the upper end thereof, in overhead gas space 25, to establish fluid communication between the hollow portion of impeller shaft 4 and the gas in overhead gas space 25. As indicated in the drawing, gas ingestion tubes, employed for secondary gas ingestion purposes, can be positioned both above and below the top of the draft tube of one or more of the impeller-draft tube assemblies in the system, and said gas ingestion tubes can be positioned at or below the top of the helical impeller within any draft tube of the overall assembly.

The invention will be seen from the above to enable the benefits of the AGR system and process to be extended to applications in which non-optimum liquid levels in the gas-liquid mixing vessel inhibit proper vortex development and desired gas ingestion from the overhead gas space into the gas-liquid mixture in the mixing vessel. By considerably extending the range of application to which the highly desirable AGR technology is applicable, the invention constitutes a highly desirable advance in the gas-liquid mixing art, applicable to desirable operations in which hydrogen, oxygen or other industrial gases are to be mixed with liquid over a broad range of liquid level within the mixing vessel.

We claim:

1. An improved process for mixing a gas and a liquid in a mixing vessel under circumstances in which the depth of said liquid changes over the course of the mixing operation comprising:

(a) introducing feed gas to the overhead gas space in a mixing vessel having two or more impeller-draft tube assemblies stacked vertically therein, each such assembly comprising a hollow draft tube with axial flow, down-pumping impeller means positioned therein for vortex development and the ingestion of gas from said overhead gas space into a body of liquid present in said mixing vessel, the lowest positioned impeller-draft tube assembly being positioned below the lowest liquid level encountered during the gas-liquid mixing operation, the highest positioned impeller-draft tube assembly being positioned below the highest liquid level encountered during said mixing operation, each next lower draft tube being positioned sufficiently below the draft tube above it so as to create a flow space between the draft tubes to allow the flow of liquid to said next lower impeller-draft tube assembly;

(b) rotating said impeller means to create a circulation of liquid downward in the lowest impeller-draft tube assembly, and in higher assemblies as the level of liquid rises in the mixing vessel, said liquid being discharged from the lowest assembly for passage upward in the annular space between said assemblies and the wall of the mixing vessel, thereby creating a vortex development and resulting ingestion of gas from the overhead gas space into the body of recirculating liquid; and (c) controlling the flow of liquid to facilitate the passage of liquid from said annular space into the flow space between adjacent draft tubes and to preclude the radial expulsion of liquid being discharged from a higher draft tube away from the inlet to the next lower draft tube, the discharge flow from an upper draft tube thus serving as the feed to the next lower draft tube, whereby gas ingestion occurs by vortex entrainment at the inlet of the lowest draft tube when the liquid level is at its lowest point, with liquid pumping, gas dispersion and mixing being accomplished with the impeller means in said lowest draft tube, with said stacked impeller-draft tube assemblies enabling said gas ingestion, gas dispersion, liquid pumping and mixing to be accomplished effectively as the liquid level changes during said gas-liquid operation.

2. The process of claim 1 in which said gas-liquid mixing is accomplished by the use of two impeller-draft tube assemblies thus positioned within the mixing vessel.

3. The process of claim 1 in which the bottom of said impeller means in impeller-draft tube assemblies other than the lowest positioned assembly is located in close proximity to the bottom end of its associated draft tube without protruding below said draft tube.

4. The process of claim 1 and including exposing the gas-liquid mixing flowing downward below the impeller means in the lowest positioned impeller-draft tube assembly to high radial shear conditions prior to discharge from said lowest draft tube.

5. The process of claim 1 and including establishing fluid communication between said overhead gas space and open ended gas ingestion tubes extending outward from the drive shaft of said impeller means, said gas ingestion tubes extending outward into the surrounding liquid at one or more locations within the mixing vessel, the pressure in the body of liquid adjacent the outer end of said gas ingestion tubes being reduced upon rotation of said impeller shaft such that the pressure reduction at the outer end of said gas ingestion tubes exceeds the hydrostatic head of liquid, thereby providing a secondary gas ingestion action in furtherance of the desired mixing of gas from the overhead gas space with the rising level of recirculating liquid within said mixing vessel.

6. An improved apparatus for mixing a gas and a liquid in a mixing vessel under circumstances in which the depth of liquid changes over the course of the mixing operation comprising:

(a) a mixing vessel for the mixing of a gas and liquid;

(b) two or more impeller-draft tube assemblies stacked vertically within said mixing vessel, each such assembly comprising a hollow draft tube with axial flow, down-pumping impeller means positioned therein for vortex development and the ingestion of gas from an overhead gas space within the mixing vessel into a body of liquid present in said mixing vessel, the lowest positioned impeller-draft tube assembly being positioned below the lowest liquid level to be encountered during the gas-liquid mixing operation, the highest positioned impeller-draft tube assembly being positioned below the highest liquid level to be encountered during said mixing operation, each next lower draft tube being positioned sufficiently below the draft tube above it so as to create a flow space between the draft tubes to allow the flow of liquid to said next lower impeller-draft tube assembly;

(c) drive shaft means for rotating the impeller means of said impeller-draft tube assemblies to create a circulation of liquid downward in the lowest impeller-draft tube assembly, and in higher assemblies as the level of liquid rises in the mixing vessel, said liquid being discharged from the lowest assembly for passage upward in the annular space between said assemblies and the wall of the mixing vessel, thereby creating said vortex development and resulting ingestion of gas from the overhead gas space into the body of recirculating liquid; and (d) baffle means for controlling the flow of liquid to facilitate the passage of liquid from said annular space into the flow space between adjacent draft tubes and to preclude the radial expulsion of liquid being discharged from a higher draft tube away from the inlet to the next lower draft tube, the discharge flow from an upper draft tube thus serving as the feed to the next lower draft tube, whereby gas ingestion occurs by vortex entrainment at the inlet of the lowest draft tube when the liquid level is at its lowest point, with liquid pumping, gas dispersion and mixing being accomplished with the impeller means in said lowest draft tube, with said stacked impeller-draft tube assemblies enabling said gas ingestion, gas dispersion, liquid pumping and mixing to be accomplished effectively as the liquid level changes during said gas-liquid operation.

7. The apparatus of claim 6 in which two impeller-draft tube assemblies are thus positioned within said mixing vessel.

8. The apparatus of claim 6 in which the bottom of said impeller means in the impeller-draft tube assemblies other than the lowest positioned assembly is located in close proximity to the bottom end of its associated draft tube without protruding below said draft tube.

9. The apparatus of claim 6 and including high shear radial impeller means positioned below said axial flow impeller means on the lowest positioned impeller-draft tube assembly.

10. The apparatus of claim 6 and including means for passing feed gas to the overhead gas space within the mixing vessel and for the passing of feed liquid to said vessel and withdrawing product therefrom.

11. The apparatus of claim 6 and including baffle means for controlling the flow of liquid to facilitate the passage of liquid from said annular space into the upper end of the highest positioned draft tube.

12. The apparatus of claim 6 and including open ended gas ingestion tubes extending outward from said drive shaft into the surrounding liquid at one or more locations within the mixing vessel, said gas ingestion tubes being in fluid communication with the overhead gas space, the reduced pressure at the outer end of said gas ingestion tubes upon rotation of said drive shaft exceeding the hydrostatic head of liquid, thereby providing a secondary gas ingestion means in furtherance of the desired mixing of gas from the overhead gas space with the rising level of recirculating liquid within said mixing vessel.

* * * * *